United States Patent
Fujiwara et al.

(10) Patent No.: US 6,521,575 B1
(45) Date of Patent: Feb. 18, 2003

(54) METHOD AND UNIT FOR REGENERATION OF SOLUTION FOR CLEANING GLASS, METHOD AND UNIT FOR CLEANING SILICATE GLASS, AND CATHODE-RAY TUBE

(75) Inventors: Kenji Fujiwara, Osaka (JP); Hisanori Yatoh, Hyogo (JP); Masao Gotoh, Hyogo (JP); Juichi Sasada, Kyoto (JP); Masanori Yamauchi, Osaka (JP); Katsuyoshi Tatenuma, Ibaraki (JP); Osamu Arai, Ibaraki (JP); Takuji Taguchi, Ibaraki (JP)

(73) Assignees: Matsushita Electric Industrial Co., Ltd., Osaka (JP); Kaken Co., Ibaraki (JP)

( * ) Notice: Subject to any disclaimer, the term of this patent is extended or adjusted under 35 U.S.C. 154(b) by 0 days.

(21) Appl. No.: 09/529,083
(22) PCT Filed: Aug. 23, 1999
(86) PCT No.: PCT/JP99/04546
§ 371 (c)(1), (2), (4) Date: Apr. 6, 2000
(87) PCT Pub. No.: WO00/12443
PCT Pub. Date: Mar. 9, 2000

(30) Foreign Application Priority Data

Aug. 26, 1998 (JP) .......................... 10-239713
Feb. 19, 1999 (JP) .......................... 11-041582
Feb. 19, 1999 (JP) .......................... 11041583

(51) Int. Cl.$^7$ .............................. C11D 7/08; C11D 7/10
(52) U.S. Cl. ...................... 510/180; 510/175; 510/186; 510/253; 510/257; 423/488
(58) Field of Search .......................... 423/488; 510/175, 510/180, 186, 253, 257

(56) References Cited

U.S. PATENT DOCUMENTS 4,056,605 A * 11/1977 Vulikh et al. ................ 423/484
4,125,594 A * 11/1978 Su et al. ...................... 423/488

FOREIGN PATENT DOCUMENTS

| JP | 46-15768 | 4/1971 |
| JP | 9-246227 | 9/1997 |

OTHER PUBLICATIONS

International Search Report dated Nov. 12, 1999.

* cited by examiner

Primary Examiner—Charles Boyer
(74) Attorney, Agent, or Firm—Merchant & Gould P.C.

(57) ABSTRACT

A treatment solution (2) containing fluoride is added to a cleaning solution (1) drained from a cleaning tank (11). Fluoride is allowed to react with fluorosilicic acid in the cleaning solution to settle a precipitate (4) containing fluorosilicate, and the precipitate (4) is removed. The cleaning solution regenerated in a regeneration apparatus (10) is again returned to the cleaning tank (11), and used as a cleaning solution for a CRT panel (20).

17 Claims, 9 Drawing Sheets

METHOD AND UNIT FOR REGENERATION OF SOLUTION FOR CLEANING GLASS, METHOD AND UNIT FOR CLEANING SILICATE GLASS, AND CATHODE-RAY TUBE

TECHNICAL FIELD

The present invention relates to a method and apparatus for regenerating a glass cleaning solution containing hydrofluoric acid, and a method and apparatus for cleaning silicate glass. In particular, the present invention relates to a method and apparatus for providing a glass surface requiring high cleanness as in a panel for a cathode-ray tube (CRT), for example. Furthermore, the present invention relates to a CRT equipped with the above-mentioned panel.

BACKGROUND ART

Hydrofluoric acid is used for etching a glass surface in producing glass for interior decoration, due to its property of dissolving silicate. Hydrofluoric acid also is used for cleaning glass, due to its property of corroding a glass surface. For example, when something remains adhering to the inner surface of a CRT glass panel for various displays and the like, a phosphor layer and the like formed on the panel are degraded, which results in a decrease in the performance of the CRT. Accordingly, a cleaning step using hydrofluoric acid is indispensable for producing a glass product requiring a very clean surface as in a CRT panel.

When cleaning a CRT panel, a glass cleaning solution containing hydrofluoric acid is circulated by a circulation apparatus connected to a panel cleaning tank so as to be used repeatedly for cleaning panels. However, when a cleaning solution is thus used repeatedly, substances adhering to glass surfaces and glass components are dissolved in the cleaning solution with an increasing number of cleaning cycles, which degrades the cleaning ability of the cleaning solution. Impurities such as dissolved glass components may adhere to a CRT panel to cause a panel defect. Under such circumstances, when cleaning a CRT panel, the cleaning solution is exchanged periodically. A used cleaning solution containing impurities is disposed of as industrial waste.

If a degraded cleaning ability is enhanced by supplying a cleaning solution with hydrofluoric acid, it becomes possible to extend the exchange cycle of a cleaning solution to some degree. However, simply supplying hydrofluoric acid will not overcome the problems related to reduction of industrial waste. Furthermore, supplying hydrofluoric acid cannot remove impurities in a cleaning solution to prevent a panel defect.

Among impurities in a cleaning solution, in particular, fluorosilicic acid (hexafluorosilicic acid; $H_2SiF_6$) generated by the reaction between silica ($SiO_2$) in glass and hydrogen fluoride (HF) causes a serious problem. Fluorosilicic acid binds with various cations contained in the cleaning solution to form a fluorosilicate in a gel state. This gel with low flowability is transparent. Therefore, when it adheres to a glass surface, the gel is difficult to recognize visually when the glass surface is wet, which is likely to cause defects in a glass product.

As described in Japanese Publication for Opposition No. 46-15768, for example, it is possible to remove impurities in hydrofluoric acid by utilizing electrolysis. However, electrolysis is not suitable as a method for removing large amounts of impurities efficiently from an exhausted glass cleaning solution. Furthermore, although electrolysis is excellent as a method for removing a trace amount of cations from hydrofluoric acid, it is not effective as a method for removing fluorosilicic acid.

Cleaning a CRT panel is applied for reusing not only a newly molded panel but also a CRT panel on which a black matrix layer or a phosphor layer has been formed. By cleaning the panel with a cleaning solution containing hydrofluoric acid, the black matrix layer and the like are removed by etching together with glass on a panel surface layer. However, these layers contain substances (e.g., carbon in the black matrix layer) which are sparingly soluble in hydrofluoric acid. Therefore, in the cleaning step for reusing a CRT panel, minute insoluble substances are likely to be generated in a large amount in the cleaning solution. If the insoluble substances are left, the surface of a panel will be damaged; therefore, it is necessary to remove insoluble substances floating in the solution. As a method for removing insoluble substances, settling them in a settling tank and filtering them with a filter are considered.

The method for settling insoluble substances in a settling tank is effective when they are large insoluble particles; however, this method is not suitable for minute insoluble substances floating in a glass cleaning solution. Furthermore, according to the method for filtering insoluble substances with a filter, a filter is clogged more quickly if it has a high filtering ability, and a filter having a low filtering ability cannot remove insoluble substances.

As described above, conventionally, a method for regenerating efficiently a glass cleaning solution containing hydrofluoric acid is not known. Reduction of industrial waste has already become a social task, and it also has become a task for the purpose of continuing enterprise activities, in response to the implementation of International Standard for Environment (ISO14001). Under such a situation, an effective method for recovering the cleaning ability of a glass cleaning solution, other than that for exchanging a glass cleaning solution, has not been found. This is becoming a serious problem in the production of glass products.

DISCLOSURE OF INVENTION

In order to overcome the above-mentioned problem, an objective of the present invention is to provide an efficient method and apparatus for regenerating a glass cleaning solution containing hydrofluoric acid that is exhausted in a large amount, utilized for cleaning and treating silicate glass. In particular, an objective of the present invention is to provide an efficient method and apparatus for regenerating a glass cleaning solution containing floating insoluble substances and fluorosilicic acid.

Another objective of the present invention is to provide a method and apparatus for cleaning silicate glass with a regenerated cleaning solution.

Still another objective of the present invention is to provide a cathode-ray tube using a panel cleaned with a regenerated cleaning solution.

In order to achieve the above-mentioned objective, a method for regenerating a glass cleaning solution of the present invention is characterized by adding fluoride to a glass cleaning solution containing hydrofluoric acid after being used for cleaning a surface of silicate glass, allowing fluorosilicic acid in the glass cleaning solution to react with the fluoride to precipitate fluorosilicate, and removing the fluorosilicate from the glass cleaning solution.

According to the above-mentioned regeneration method, a large amount of glass cleaning solution can be regenerated efficiently. In particular, according to the above-mentioned method, hydrogen fluoride is generated in the precipitation of fluorosilicate, and the hydrogen fluoride contributes to the recovery of the cleaning ability of the glass cleaning solution. According to the regeneration method, since the glass cleaning solution can be regenerated by an industrial procedure, the exchange cycle of the glass cleaning solution can be extended.

In the regeneration method, it is preferable that fluoride is provided from at least one compound selected from the group consisting of lithium fluoride, sodium fluoride, potassium fluoride, rubidium fluoride, cesium fluoride, magnesium fluoride, strontium fluoride, barium fluoride, cobalt fluoride, manganese fluoride, copper fluoride, and ammonium fluoride. This is because fluorosilicic acid can be removed efficiently by using these fluorides.

Furthermore, in the above-mentioned regeneration method, it is preferable that hydrofluoric acid is supplied to the glass cleaning solution from which fluorosilicate has been removed. Furthermore, in the above-mentioned regeneration method, it is preferable that fluoride is added together with hydrofluoric acid. Hydrogen fluoride generated by the above-mentioned regeneration method does not cover all the hydrogen fluoride consumed, for example, in the generation of fluorosilicic acid. However, in the above-mentioned preferable example, the cleaning ability of the glass cleaning solution is sufficiently recovered, and the exchange cycle of the glass cleaning solution can be further extended.

Furthermore, in the above-mentioned regeneration method, it is preferable that the concentration of Si in the glass cleaning solution after being used for cleaning the surface of silicate glass is measured, and an amount of fluoride to be added is set at an amount or more required for all the Si to be changed to fluorosilicate. It is preferable that fluoride is added in an amount one to two times that required for all the Si to be changed to fluorosilicate. In the preferable example, as fluoride is added in an amount in accordance with the concentration of Si. Therefore, fluoride can be prevented from being added in such an excessive amount as to become an impurity, causing another problem and insufficient removal of fluorosilicic acid.

Furthermore, in order to achieve the above-mentioned objective, a method for cleaning silicate glass of the present invention is characterized in that the surface of silicate glass is cleaned with the glass cleaning solution regenerated by the above-mentioned regeneration method.

Furthermore, another method for cleaning silicate glass of the present invention is characterized in that a regeneration step of regenerating the glass cleaning solution regenerated in the above-mentioned regeneration method is conducted concurrently with a cleaning step of cleaning the surface of silicate glass with the glass cleaning solution obtained in the regeneration step, and the glass cleaning solution used in the cleaning step is regenerated in the regeneration step, whereby the glass cleaning solution is used while being regenerated.

According to the above-mentioned cleaning methods, the amount of industrial waste containing hydrofluoric acid can be reduced more compared with the prior art, and defects in a glass product caused by adhesion of fluorosilicate can be reduced.

According to the above-mentioned cleaning methods, it is preferable that the silicate glass is a panel for a cathode-ray tube. This is because a panel for a cathode-ray tube particularly requires a clean surface, and is cleaned with a glass cleaning solution containing a large amount of hydrofluoric acid.

In particular, the above-mentioned cleaning methods exhibit outstanding effects in the case where the silicate glass includes a panel on which surface at least one selected from the group consisting of a black matrix layer, a phosphor layer, and a metal back layer is present. Although substances insoluble in the glass cleaning solution are generated from each of the layers, these insoluble substances can be removed together with fluorosilicate according to the above-mentioned cleaning methods.

In order to achieve the above-mentioned objective, an apparatus for regenerating a glass cleaning solution of the present invention is characterized by including: a treatment tank for adding fluoride to a glass cleaning solution containing hydrofluoric acid after being used for cleaning a surface of silicate glass; and fluorosilicate separating means for removing fluorosilicate, precipitated by reaction between fluorosilicic acid in the glass cleaning solution and the fluoride, from the glass cleaning solution.

The above-mentioned regeneration apparatus enables a large amount of glass cleaning solution to be regenerated efficiently. The apparatus also ,enables insoluble substances floating in the glass cleaning solution to be removed together with fluorosilicate. Furthermore, in the above-mentioned apparatus, hydrogen fluoride is generated in precipitation of fluorosilicate, and the hydrogen fluoride contributes to the recovery of the cleaning ability of the glass cleaning solution. Thus, the above-mentioned regeneration apparatus enables a glass cleaning solution to be regenerated by an industrial procedure, so that the exchange cycle of the glass cleaning solution can be extended.

It is preferable that the above-mentioned regeneration apparatus further includes a settling tank for receiving the glass cleaning solution from a bottom of the treatment tank.

Furthermore, in the above-mentioned regeneration apparatus, the fluorosilicate separating means is not particularly limited, as long as it is an apparatus provided with a function of separating a solid from a liquid, and may be a filtering apparatus such as a filter. However, the fluorosilicate separating means preferably includes a drain cock provided on the bottom part of the treatment tank and/or the settling tank. This is because such a drain cock enables efficient separation and is preferable for continuous operation of the regeneration apparatus.

It is preferable that the above-mentioned regeneration apparatus further includes an adjustment tank for supplying hydrofluoric acid to the glass cleaning solution from which fluorosilicate has been removed. In the preferable example, the exchange cycle of the glass cleaning solution can be further extended. Furthermore, although not particularly limited, it is preferable that the above-mentioned adjustment tank is disposed so as to receive the glass cleaning solution from the vicinity of a surface of the solution in the above-mentioned settling tank (treatment tank in the absence of the settling tank).

In order to achieve the above-mentioned objective, an apparatus for cleaning silicate glass of the present invention is characterized by including the above-mentioned regeneration apparatus and a cleaning tank for receiving the glass cleaning solution from the regeneration apparatus and cleaning the surface of silicate glass with the glass cleaning solution.

Furthermore, another apparatus for cleaning silicate glass of the present invention is characterized by including the above-mentioned regeneration apparatus and a cleaning tank for receiving the glass cleaning solution from the regeneration apparatus and cleaning the surface of silicate glass with the glass cleaning solution, wherein the glass cleaning solution used in the cleaning tank is further regenerated in the regeneration apparatus, whereby the glass cleaning solution is used while being regenerated.

The above-mentioned regeneration apparatus enables the amount of industrial waste containing hydrofluoric acid to be reduced more compared with the prior art. The regeneration apparatus also enables the defects in a glass product caused by adhesion of fluorosilicate to be reduced.

Furthermore, according to the present invention, a cathode-ray tube is provided, which includes a panel for a cathode-ray tube cleaned by the above-mentioned cleaning method.

BEST MODE FOR CARRYING OUT THE INVENTION

Hereinafter, the present invention will be described by way of preferred embodiments with reference to the drawings.

Figure 1:
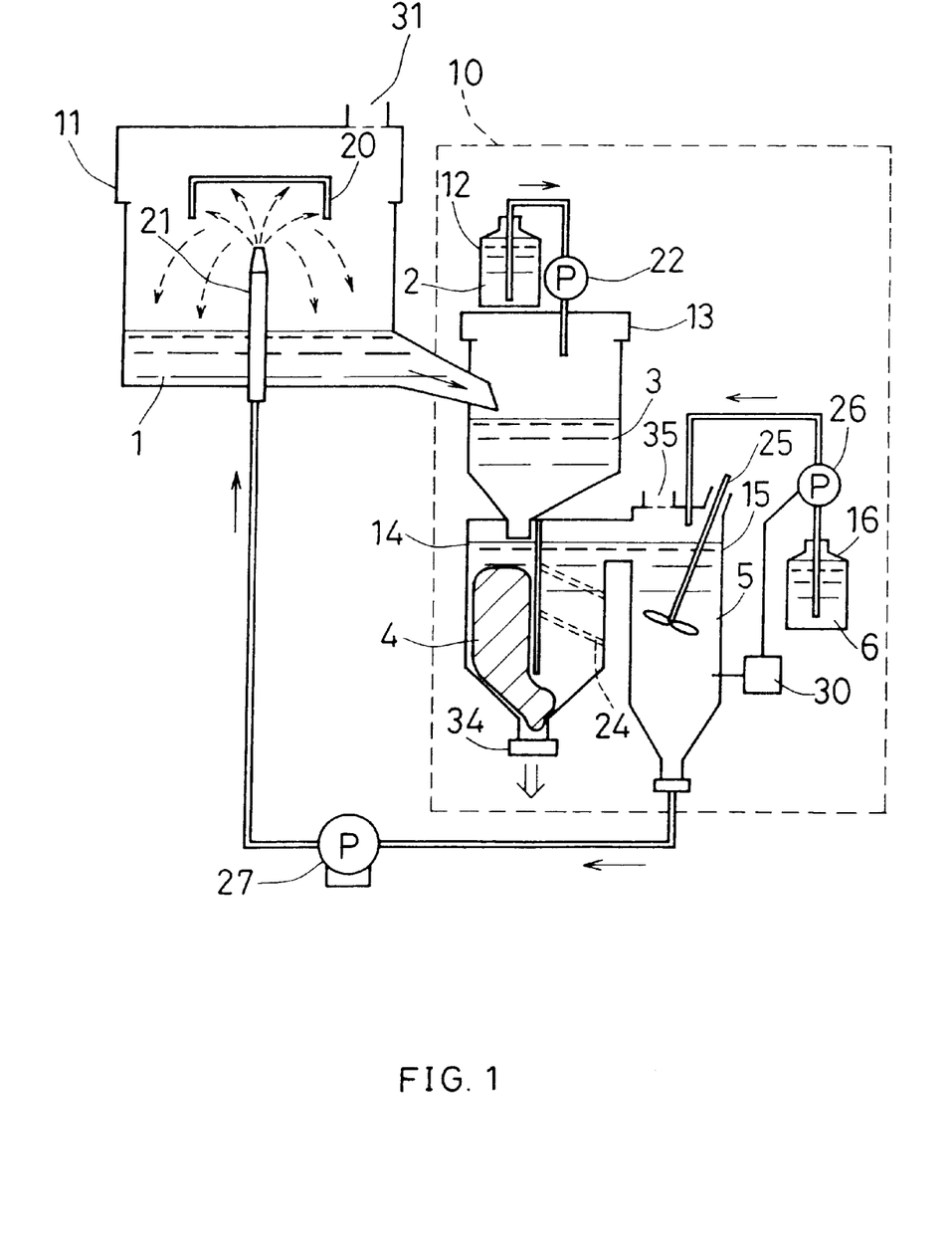
FIG. 1 is a view showing a structure of one embodiment of a cleaning apparatus of the present invention.

In an apparatus for cleaning silicate glass shown in FIG. 1, a regeneration apparatus 10 for regenerating a glass cleaning solution and a glass cleaning tank 11 form a circulation path for a glass cleaning solution.

The regeneration apparatus 10 includes a treatment tank 13, a settling tank 14, and an adjustment tank 15. The treatment tank 13 and the adjustment tank 15 are connected to a treatment solution tank 12 and a hydrofluoric acid tank 16 through pipes equipped with pumps 22 and 26, respectively.

The treatment tank 13 receives a glass cleaning solution 1 drained from the cleaning tank 11 and a treatment solution 2 injected from the treatment solution tank 12 through the pump 22 so that these solutions are mixed. The treatment solution tank 12 stores a solution containing fluoride (described later). The treatment tank 13 may be provided with such a stirring device (described later) as disposed in the adjustment tank.

The settling tank 14 is disposed below the treatment tank 13. A cleaning solution 3 mixed with the treatment solution 2 is drained from the bottom of the treatment tank 13 to the settling tank 14. A precipitate 4 settled from the cleaning solution 3 upon the addition of the treatment solution 2 contains insoluble substances contained in the cleaning solution 3. The precipitate 4 is settled in the solution to be accumulated on the bottom of the settling tank 14. A drain cock 34 is disposed on the bottom part of the settling tank 14, and the precipitate 4 is drained out of the apparatus through the drain cock 34. On the other hand, the cleaning solution with the precipitate 4 removed therefrom moves upward in a compartment partitioned by an inner wall in the settling tank while passing through filters 24, and flows to the adjustment tank 15. A trace amount of impurity in the solution that is not removed out of the apparatus through the drain cock and remains in the solution is filtered with the filters 24.

In the case where a precipitate can be sufficiently settled in the treatment tank 13, a drain cock may be provided on the bottom of the treatment tank 13 without providing the settling tank 14 so that the precipitate is drained through the drain cock.

The adjustment tank 15 communicates with the settling tank in an upper portion so as to have a liquid surface in common with the settling tank 14. Thus, the adjustment tank 15 is designed in such a manner that only a supernatant of the cleaning solution from which the precipitate has been separated in the settling tank 14 flows into the adjustment tank 15. Furthermore, the adjustment tank 15 is connected to the hydrofluoric acid tank 16, so that a predetermined amount of hydrofluoric acid 6 is injected from the hydrofluoric acid tank 16 to the adjustment tank 15 through the pump 26. Furthermore, the adjustment tank 15 is provided with a stirring unit 25 for stirring a cleaning solution 5 with the hydrofluoric acid 6 added thereto and an exhaust port 35 for local venting.

The adjustment tank 15 is provided with a monitoring system 30 in the vicinity of a drain port disposed on the bottom. The monitoring system 30 is an HF monitor for measuring the concentration of hydrofluoric acid in the cleaning solution, and also is equipped with a controller for controlling the liquid amount of hydrofluoric acid. The controller transmits an operation signal to the pump 26 in accordance with the concentration of hydrofluoric acid, the state of the cleaning solution, and the like, thereby controlling the amount of hydrofluoric acid 6 to be added. In this manner, the regeneration apparatus 10 includes an adjustment mechanism capable of controlling the concentration of hydrofluoric acid in the cleaning solution in a predetermined range.

The drain port of the adjustment tank for hydrofluoric acid is connected to the cleaning tank 11 through a pipe having a circulation pump 27, and a regenerated glass cleaning solution is returned from the adjustment tank 15 to the cleaning tank 11.

The cleaning tank 11 shown in FIG. 1 is used for cleaning a CRT panel. In this cleaning tank, the regenerated cleaning solution is discharged upward from a nozzle 21, whereby the inner surface of a CRT panel 20 held substantially in a horizontal direction is cleaned. The cleaning solution is again supplied to the treatment tank 13 and contains substances adhering to the surface of the panel and glass components dissolved together with the substances. CRT panels are continuously placed in the cleaning tank 11 by a transportation apparatus (not shown), and successively output from the cleaning tank after cleaning. In the cleaning tank 11, an exhaust port 31 is disposed in the same manner as in the adjustment tank 15. A CRT panel is cleaned while the cleaning tank 11 is locally vented through the exhaust port 31.

As described above, in the above-mentioned cleaning apparatus, a solution circulation system composed of pumps and the like allows CRT panels to be cleaned with a cleaning solution circulating between the cleaning tank and the regeneration apparatus. Furthermore, the cleaning solution is regenerated, and panels are cleaned with the regenerated cleaning solution. This cycle is repeated.

Figure 2:
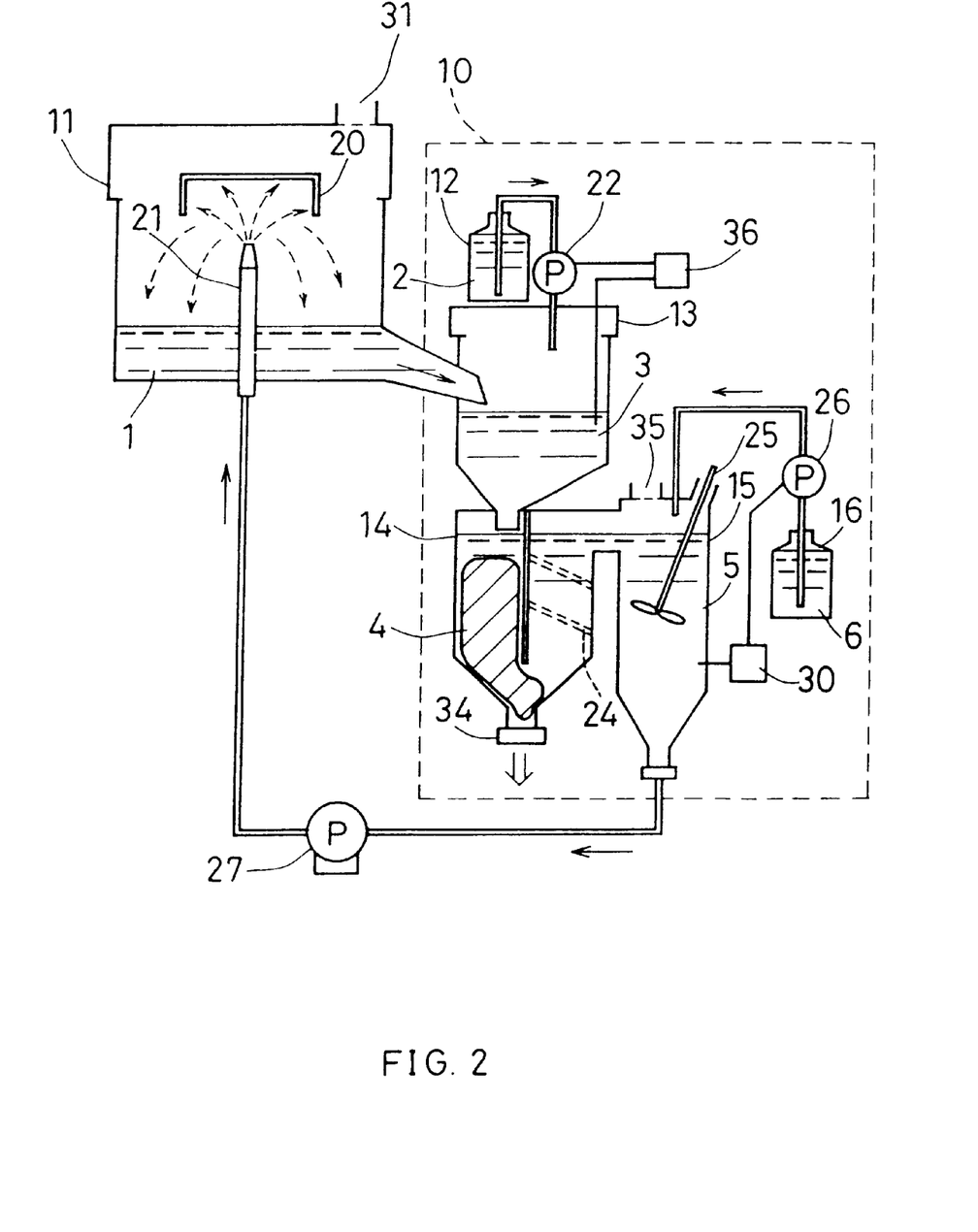
FIG. 2 is a view showing a structure of another embodiment of a cleaning apparatus of the present invention.

Another apparatus for cleaning silicate glass shown in FIG. 2 is the same as that shown in FIG. 1, except that a Si monitoring system 36 is provided for the treatment tank 13.

In the apparatus shown in FIG. 2, the Si concentration in the glass cleaning solution 3 is measured by the Si monitoring system 36. The system also is provided with addition amount control means (controller) for regulating the amount of a treatment solution to be added. The controller calculates a required amount of the treatment solution in accordance with the amount of Si obtained by measurement, and transmits an operation signal to the pump 22 based on this value to adjust the amount of the treatment solution 2 to be injected. In this way, if the Si monitoring system 36 is provided for the treatment tank 13, an appropriate amount of the treatment solution 2 can be injected while the Si amount in the glass cleaning solution 3 is monitored and fed back.

As described above, since the treatment solution 2 can be added while its effect is confirmed, the Si monitoring system 36 is preferably provided for the treatment tank 13.

For example, in the case where CRT panels are cleaned for the purpose of regeneration, examples of the main substances insoluble in hydrofluoric acid and contained in substances adhering to the surface of a CRT panel include carbon contained in a black matrix layer, phosphor particles contained in a phosphor layer, and aluminum contained in a metal back layer.

The preferable concentration of hydrofluoric acid in the glass cleaning solution should be determined in accordance with a cleaning method and glass to be cleaned. For example, the concentration is preferably about 3 to about 20% by weight.

Hereinafter, one embodiment of a method for cleaning glass and a method for regenerating a glass cleaning solution will be described.

The glass to be cleaned is silicate glass containing silica ($SiO_2$) as a glass network component. The composition of the silicate glass is not particularly limited. Various compositions can be used, such as a composition of general-purpose sheet glass that can be produced by a float process and a glass composition of a CRT panel. Table 1 shows an example of a glass composition of a CRT. One feature of this glass composition is that it contains 5% by weight or more of $K_2O$ and 10% by weight or more of BaO.

TABLE 1

Example of glass composition of a CRT panel

| Component | Content (% by weight) |
|---|---|
| $SiO_2$ | 60-65 |
| $Al_2O_3$ | 2-5 |
| CaO | 1-3 |
| MgO | 1-2 |
| PbO | 1-3 |
| BaO | 10-15 |
| $Na_2O$ | 8-10 |
| $K_2O$ | 5-10 |

Glass components are not dissolved in a ratio exactly reflecting a content ratio as illustrated in Table 1. For example, an alkali component is mostly dissolved in a ratio exceeding a content ratio. However, in any case, $SiO_2$ accounting for half or more of the glass components remains in a cleaning solution as a main dissolved component. As represented by the following Reaction Formula (1), $SiO_2$ reacts with hydrogen fluoride and is dissolved in the cleaning solution as fluorosilicic acid (hexafluorosilicic acid).

$$SiO_2 + 6HF \rightarrow H_2SiF_6 + 2H_2O \tag{1}$$

The glass cleaning solution 1 containing fluorosilicic acid and minute insoluble substances flows to the treatment tank 13, and is mixed with the treatment solution 2 therein. The treatment solution 2 is supplied as an aqueous solution containing fluoride or hydrofluoric acid containing fluoride. Herein, inorganic fluoride, in particular, hydrofluoride is preferable as the fluoride.

When fluoride is added to the cleaning solution 1, a hydrogen fluoride elimination reaction is effected. More specifically, fluoride reacts with the above-mentioned fluorosilicic acid generated from silica in the glass to generate fluorosilicate and hydrogen fluoride. For example, elimination of hydrogen fluoride in the case of using potassium fluoride can be represented by the following Reaction Formula (2).

$$H_2SiF_6 + 2KF \rightarrow K_2SiF_6 \downarrow + 2HF \tag{2}$$

In the cleaning solution 3 with the treatment solution 2 added thereto, fluorosilicate is precipitated as represented by the above-mentioned reaction formula. The precipitated fluorosilicate is settled in the treatment tank 13 while engulfing insoluble substances floating and dispersed in the cleaning solution 3, and is drained to the settling tank 14 connected to the bottom of the treatment tank. The insoluble substances and fluorosilicate drained into the settling tank 14 are further settled in the settling tank 14, and accumulated on the bottom of the tank as the precipitate 4. The precipitate 4 is drained through the drain cock 34 disposed on the lower end of the settling tank.

In the case where only fluorosilicate is settled, the precipitate 4 becomes white. However, in the case where impurities are precipitated with fluorosilicate, the precipitate 4 may be colored. For example, in the case where black carbon particles are present as impurities, the precipitate 4 becomes gray (i.e., white color of fluorosilicate is mixed with black color of carbon). In this case, a cleaning solution from which fluorosilicate has not been precipitated is colored by black due to the carbon particles. However, a supernatant of the cleaning solution from which the precipitate 4 has been separated becomes substantially water-clear. This cleaning solution is transported upward in a compartment in the settling tank while being filtered through the filters 24, and flows from the vicinity of the surface of the solution in the settling tank 14 to the adjustment tank 15.

Hydrogen fluoride is partly regenerated as represented by the above-mentioned Reaction Formula (2). However, as is apparent by referring to the Reaction Formula (2) together with the Reaction Formula (1), all the hydrogen fluoride consumed by reacting with $SiO_2$ is not regenerated. The cleaning solution 5, from which fluorosilicate and impurities other than glass components floating and dispersed in the cleaning solution 3 had been removed, is supplied with hydrofluoric acid in the adjustment tank 15. Hydrofluoric acid is added while the concentration thereof in the cleaning solution is measured by the monitoring system 30. The preferable concentration of hydrofluoric acid adjusted in this manner is as illustrated above.

The concentration of remaining fluorosilicic acid may be simultaneously measured by the monitoring system 30. In this case, in accordance with the measured concentration of fluorosilicic acid, it is preferable that the amount of fluoride to be supplied to the treatment tank 13 is further fine-adjusted.

Thus, the glass cleaning solution, in which the impurities in the cleaning solution 3 have been reduced and the concentration of hydrofluoric acid has been adjusted, is again supplied to the cleaning tank 11 through the circulation pump 27, and is again used for cleaning the CRT panel 20.

Hereinafter, fluoride to be added will be studied. The fluoride is not particularly limited, as long as it reacts with fluorosilicic acid to generate fluorosilicate and hydrogen fluoride as represented by the above-mentioned Reaction Formula (2). Specifically, the fluoride is preferably at least one compound selected from lithium fluoride (LiF), sodium fluoride (NaF), potassium fluoride (KF), rubidium fluoride (RbF), cesium fluoride (CsF), magnesium fluoride ($MgF_2$), strontium fluoride ($SrF_2$), barium fluoride ($BaF_2$), cobalt fluoride ($CoF_2$), manganese fluoride ($MnF_2$), copper fluoride ($CuF_2$), and ammonium fluoride ($NH_4F$).

In order to efficiently remove fluorosilicate generated from fluoride, the solubility of the fluorosilicate to be generated from fluoride with respect to water is preferably small. On the other hand, the solubility of the fluoride itself is preferably large to some degree with respect to water. This is because the fluoride is likely to be mixed in the cleaning solution. From this point of view, NaF, KF, RbF, and CsF are further preferable as fluoride. Table 2 shows the solubility of fluorides (RF) of alkali metal (R) with respect to water, and the solubility of fluorosilicate ($R_2SiF_6$) to be generated from these fluorides with respect to water. The solubility is measured at a water temperature of 25° C.

TABLE 2

| Fluoride | Solubility [g/100 g-$H_2O$] | Solubility of corresponding fluorosilicate [g/100 g-$H_2O$] |
| --- | --- | --- |
| NaF | 4 | 0.65 |
| KF | 92.3 | 0.12 |
| RbF | 130.6 | 0.16 |
| CsF | 366.5 | 0.027 |

In order to allow all the fluorosilicic acid in the glass cleaning solution to react with fluoride in accordance with the above-mentioned Reaction Formula (2), it is theoretically required that fluoride is added in an amount that is the equivalent (chemical equivalent) of fluorosilicic acid present in the glass cleaning solution. In order to confirm the amount of fluoride actually required, various amounts of fluorides (KF) were added to cleaning solutions that were used for cleaning CRT panels, and the cleaning ability of each glass cleaning solution was examined.

First, a CRT panel having the composition as shown in Table 1 was placed as glass to be cleaned in the cleaning tank similar to that shown in FIG. 1, and CRT panels successively transported to the cleaning tank were cleaned with a circulating glass cleaning solution. At this time, KF was not added in the circulation step, and hydrofluoric acid was added to the cleaning solution so that the concentration thereof became constant under monitoring. After a predetermined period of time, a part of the cleaning solution was collected, and the Si concentration in the cleaning solution was determined by ICP emission spectrometry. KF was added to the cleaning solution so that its molar ratio to the Si concentration became a predetermined value. Thereafter, a glass chip (thickness: 1 mm, diameter: 15 mm) having the composition similar to that of the above-mentioned CRT panel was soaked in 30 ml each of the above-mentioned cleaning solutions, and allowed to stand for 10 minutes while stirring with a stirrer at room temperature. The weight of each glass chip before and after being soaked was measured. The percentage of a weight decrease of each glass chip is shown in FIG. 3.

Figure 3:
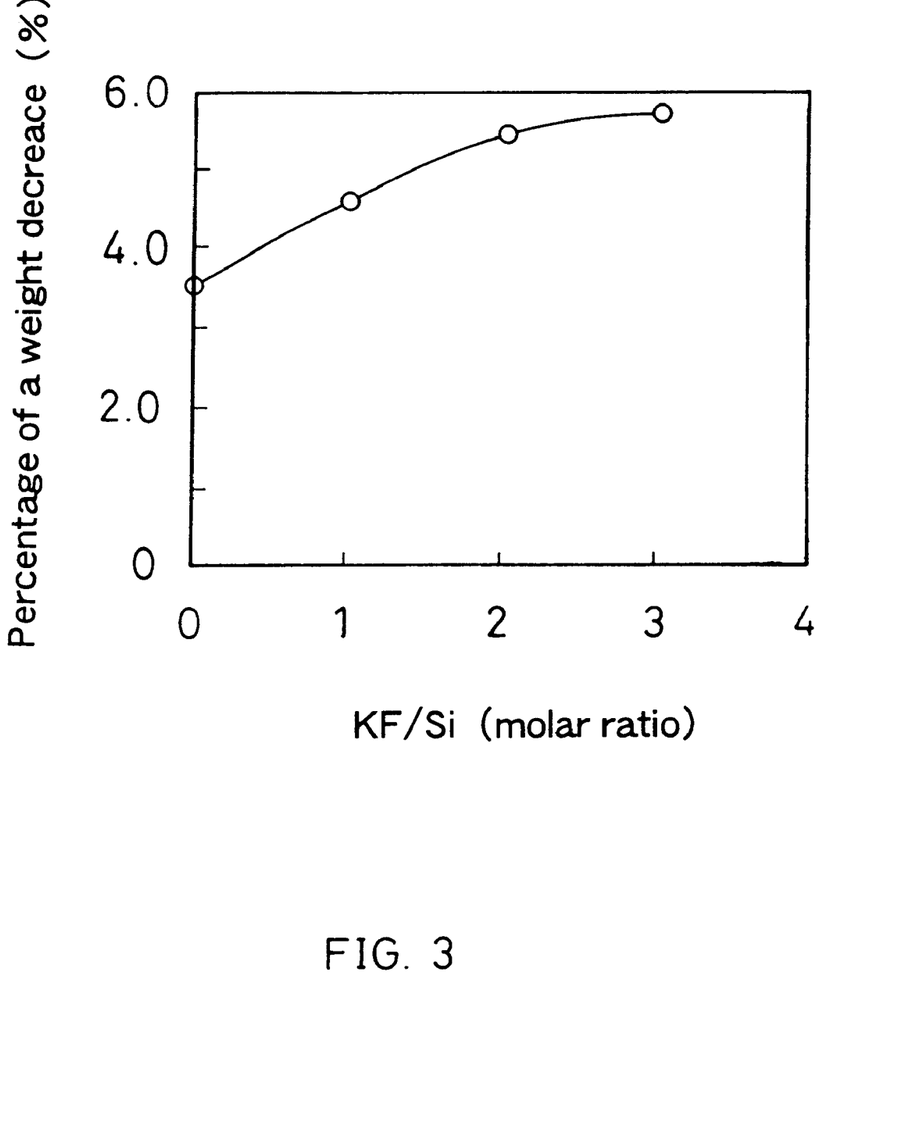
FIG. 3 is a graph showing the relationship between the molar ratio of added KF to Si in a glass cleaning solution and the percentage of a weight decrease of a glass chip soaked in the solution.

As shown in FIG. 3, as the molar ratio of KF to Si is increased, the percentage of a weight decrease of a glass chip is increased. Consequently, as represented by the above-mentioned Reaction Formula (2), it was confirmed that a chemical reaction of generating HF was effected by the addition of KF. On the other hand, when the molar ratio of KF to Si exceeds 2 (in other words, KF is added in an amount exceeding the equivalent of fluorosilicic acid in the cleaning solution), even if KF is added more, the percentage of a weight decrease of glass was only slightly increased. This tendency agrees with the results expected from the above-mentioned Reaction Formula (2).

To add KF in an excess amount is not preferable because excessive potassium ions are generated. Thus, considering the generation of HF in accordance with the Reaction Formula (2), fluoride is preferably added in an amount corresponding to one to two times (in particular, 1 to 1.5 times) the equivalents of fluorosilicic acid present in the glass cleaning solution.

Figure 4:
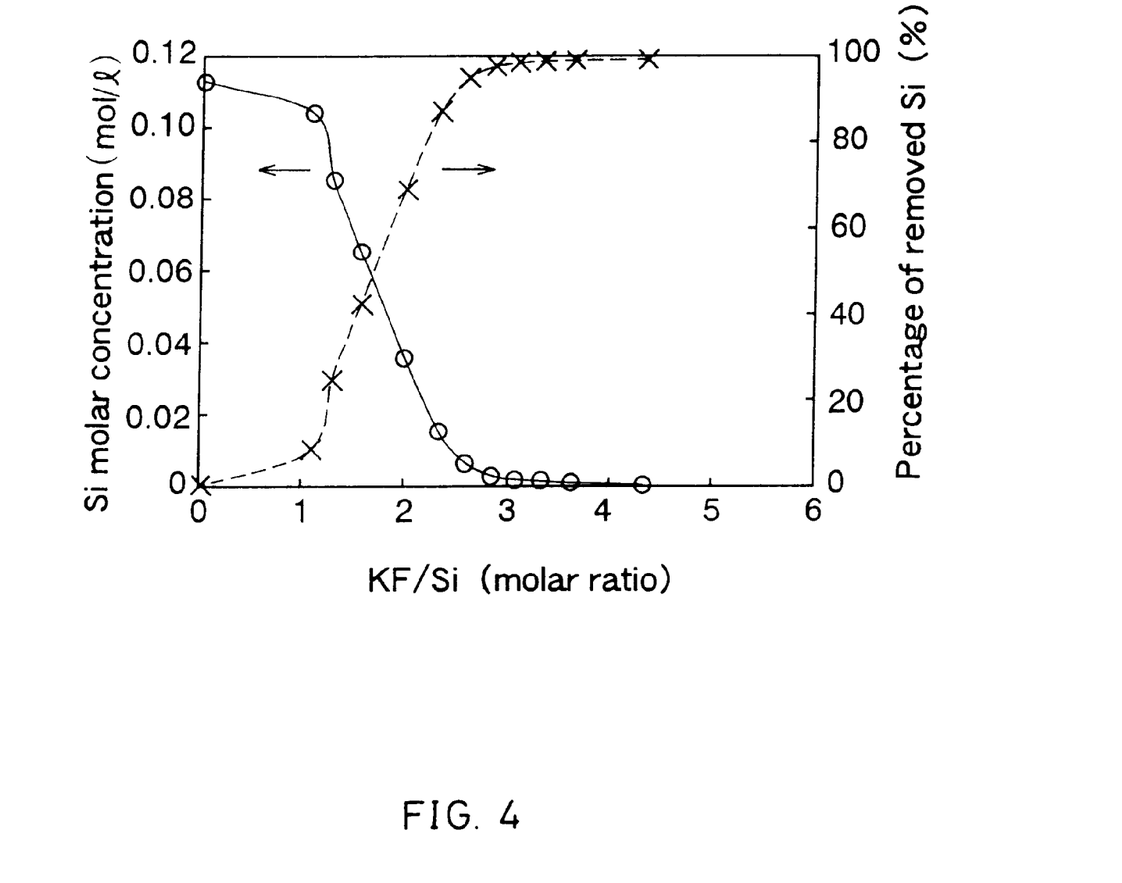
FIG. 4 is a graph showing the relationship among the molar ratio of added KF to Si in a glass cleaning solution, the Si concentration in the solution, and the percentage of removed Si.

Next, FIG. 4 shows the change in Si concentration and the change in percentage of removed Si in the glass cleaning solution by the addition of KF.

As shown in FIG. 4, when the molar ratio of KF to Si was set at 2 (equivalence point of KF with respect to Si), about 70% of Si in the glass cleaning solution was removed. When the molar ratio was set at 3, 90% or more of Si in the glass cleaning solution was removed. As is understood from the results shown in FIG. 4, considering the removal of Si in the glass cleaning solution, the molar ratio of KF to Si is preferably 2 to 4 (i.e., fluoride is preferably added in an amount corresponding to one to two times the equivalents of fluorosilicic acid), more preferably 2 to 3.5, and most preferably 2.5 to 3.5. In the case where excessive KF may be present, considering the reflectance and the like in an actual apparatus, KF may be added in a molar ratio of about 2 to about 4.5.

From the results shown in FIGS. 3 and 4, in the following test, KF was added in a molar ratio of 3 with respect to Si.

In order to confirm the effect of addition of KF in the case where a glass cleaning solution is regenerated repeatedly, and the behavior of various cations dissolved from glass, the following study was conducted.

First, a glass chip was dissolved in hydrofluoric acid to prepare a cleaning solution with a Si concentration of 2500 ppm containing 11% by weight of hydrofluoric acid. A glass chip (thickness: 1 mm, diameter: 15 mm) having a composition similar to that shown in Table 1 was soaked in 30 ml of this cleaning solution. The cleaning solution was kept at 34° C., and allowed to stand for 10 minutes while stirring with a stirrer. The amount of a weight decrease of the glass chip and the concentrations of cations in the cleaning solution were measured. The concentrations of cations were measured by ICP emission spectrometry.

Then, KF was added in a molar ratio of 3 with respect to Si in the cleaning solution, and the concentration of hydrofluoric acid was adjusted to 11% by weight. A glass chip (thickness: 1 mm, diameter: 15 mm) having the composition similar to that shown in Table 1 was soaked in 30 ml of this cleaning solution. The cleaning solution was kept at 34° C., and allowed to stand for 10 minutes while stirring with a stirrer. The amount of the weight decrease of the glass chip and the concentrations of cations in the cleaning solution were measured.

Figure 5:
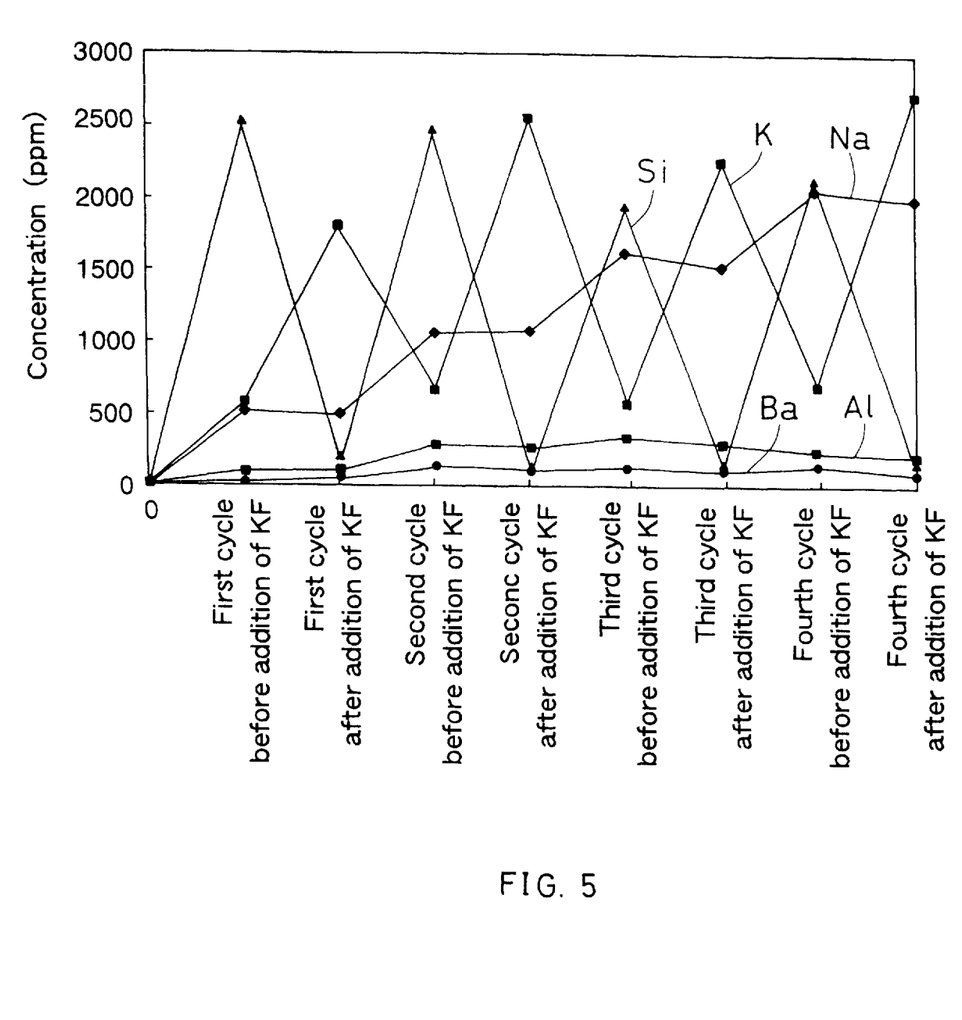
FIG. 5 is a graph showing changes in concentrations of cations in a cleaning solution containing hydrofluoric acid in a continuous test.
Figure 6:
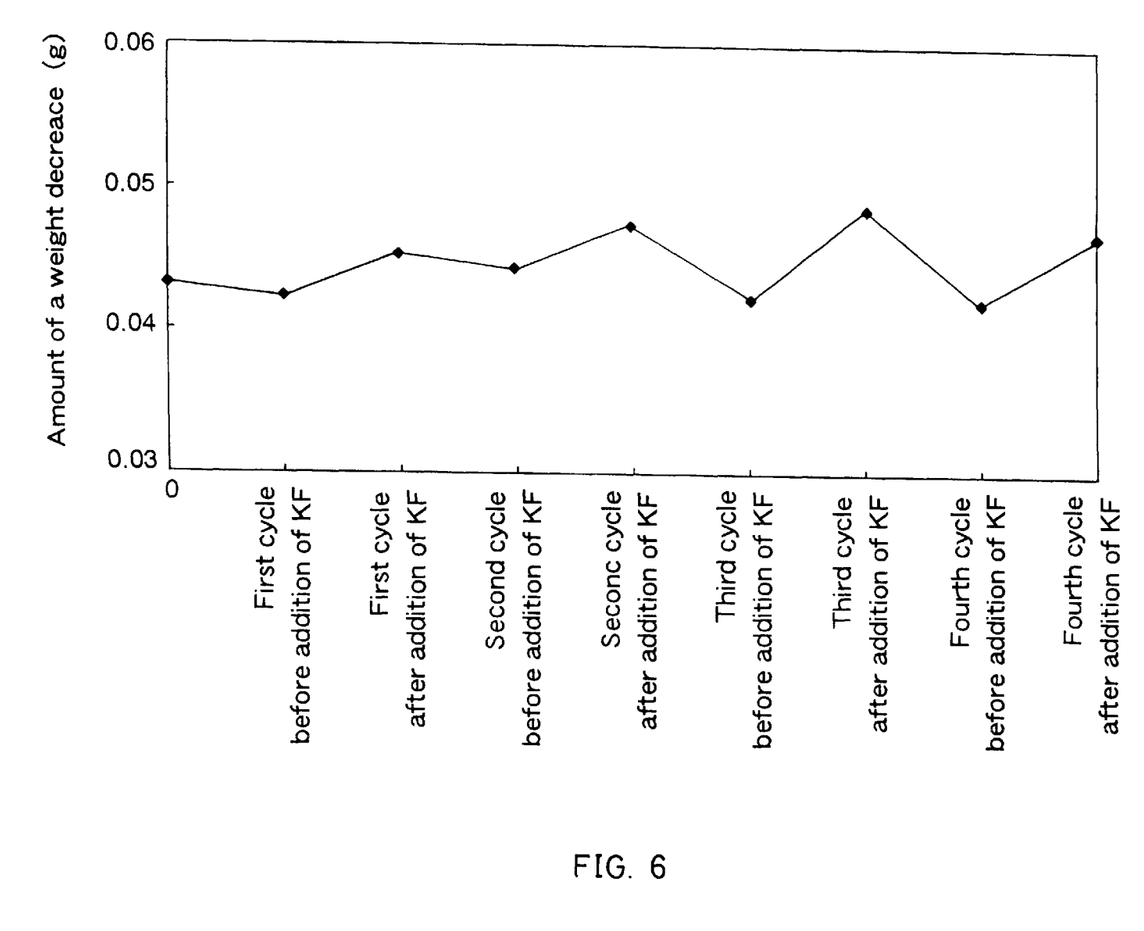
FIG. 6 is a graph showing the change in the amount of a weight decrease of a glass chip in a continuous test.

The above test was determined as one cycle. A glass chip in the same amount as that in the first cycle was dissolved in the above-mentioned cleaning solution after one cycle, and the same test as the above was repeated for four cycles in total. FIG. 5 shows the changes in concentrations of various kinds of cations in the cleaning solution, and FIG. 6 shows the amount of a weight decrease of the glass chip. Concurrently, the changes in concentrations of cations not shown in FIG. 5 also were measured. The concentration of each of these cations was at the Ba level or less.

Figure 7:
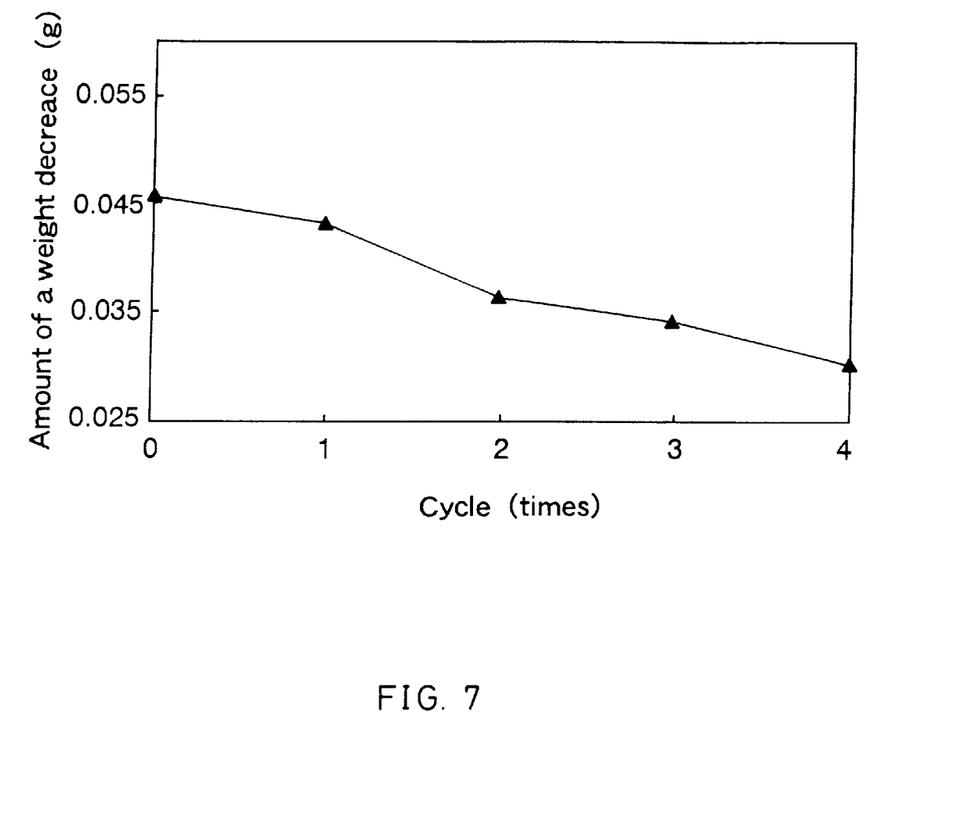
FIG. 7 is a graph showing the change in the amount of a weight decrease of a glass chip in the case where KF is not added in a continuous test.

As shown in FIG. 5, it was confirmed that 90% or more of Si can be removed continuously by the addition of KF. Furthermore, Si and K are not substantially accumulated. As shown in FIG. 6, it was confirmed that the amount of a weight decrease of glass is almost constant, and the cleaning ability of the cleaning solution was substantially maintained. On the other hand, in the case where the same test was conducted without addition of KF, the cleaning ability of glass was monotonically decreased as shown in FIG. 7.

Next, the results will be described, which are obtained by measuring a change in the settled amount of insoluble substances with the passage of time in the glass cleaning solution.

In the same way as above, first, a CRT panel having the composition as shown in Table 1 was placed as glass to be cleaned in the cleaning tank similar to that shown in FIG. 1. CRT panels successively transported to the cleaning tank were cleaned with a circulating glass cleaning solution. At this time, KF was not added in the circulation step, and hydrofluoric acid was added to the cleaning solution so that its concentration became constant under monitoring.

In this case, a CRT panel with a black matrix layer, a phosphor layer, and a metal back layer formed on its surface was used.

Figure 8:
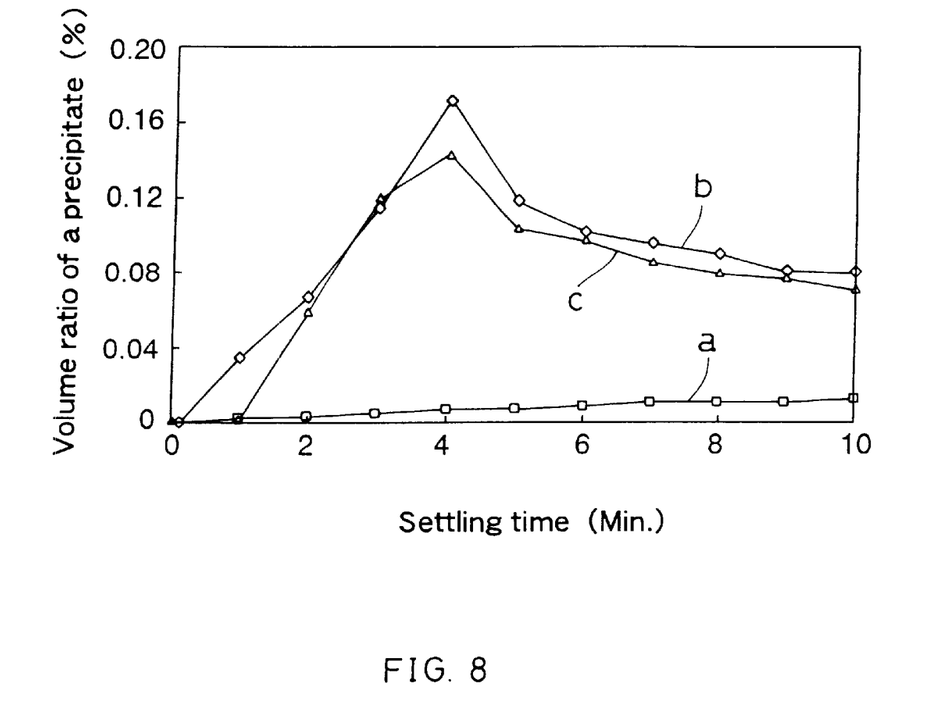
FIG. 8 is a graph showing relationships between settling of insoluble substances and settling time in a glass cleaning solution in which minute insoluble substances are dispersed, comparing the case where KF is added with the case where KF is not added.

After a predetermined period of time, a part of the cleaning solution was collected and placed in a beaker, and a change in the amount of a precipitate was measured with the passage of time. FIG. 8 shows the results. The volume ratio of the precipitate in FIG. 8 is obtained by reading a volume ratio of the precipitate to the cleaning solution with a scale of the beaker.

In FIG. 8, a curve (a) represents the results in the case where the collected cleaning solution was allowed to stand without adding KF. In this case, the precipitate is composed of insoluble substances such as carbon and phosphor particles. A curve (b) represents the results in the case where KF was added to the collected cleaning solution, and the resultant mixture was allowed to stand. In this case, the precipitate is composed of fluorosilicate and the above-mentioned insoluble substances. A curve (c) represents the results in the case where the collected cleaning solution was filtered to remove insoluble substances therein, KF was added to the cleaning solution, and the resultant mixture was allowed to stand. In this case, the precipitate is composed of fluorosilicate.

Comparing the curves (a) to (c), it can be confirmed that settling of impurities floating in the solution was promoted by precipitation of fluorosilicate. When the solution was actually observed, the following results were obtained. More specifically, in the case where the impurities were settled by simply allowing the solution to stand (curve a), floating of carbon particles and the like was observed even 10 minutes later. In the case where KF was added (curve b), the impurities were hardly observed 10 minutes later.

As represented by the curves (b) and (c), the volume ratio of the precipitate was decreased four minutes after the commencement of settling. This is because the precipitate was gradually contracted.

Thus, it was confirmed that settling of insoluble substances dispersed in the cleaning solution was promoted by precipitation of fluorosilicate.

Figure 9:
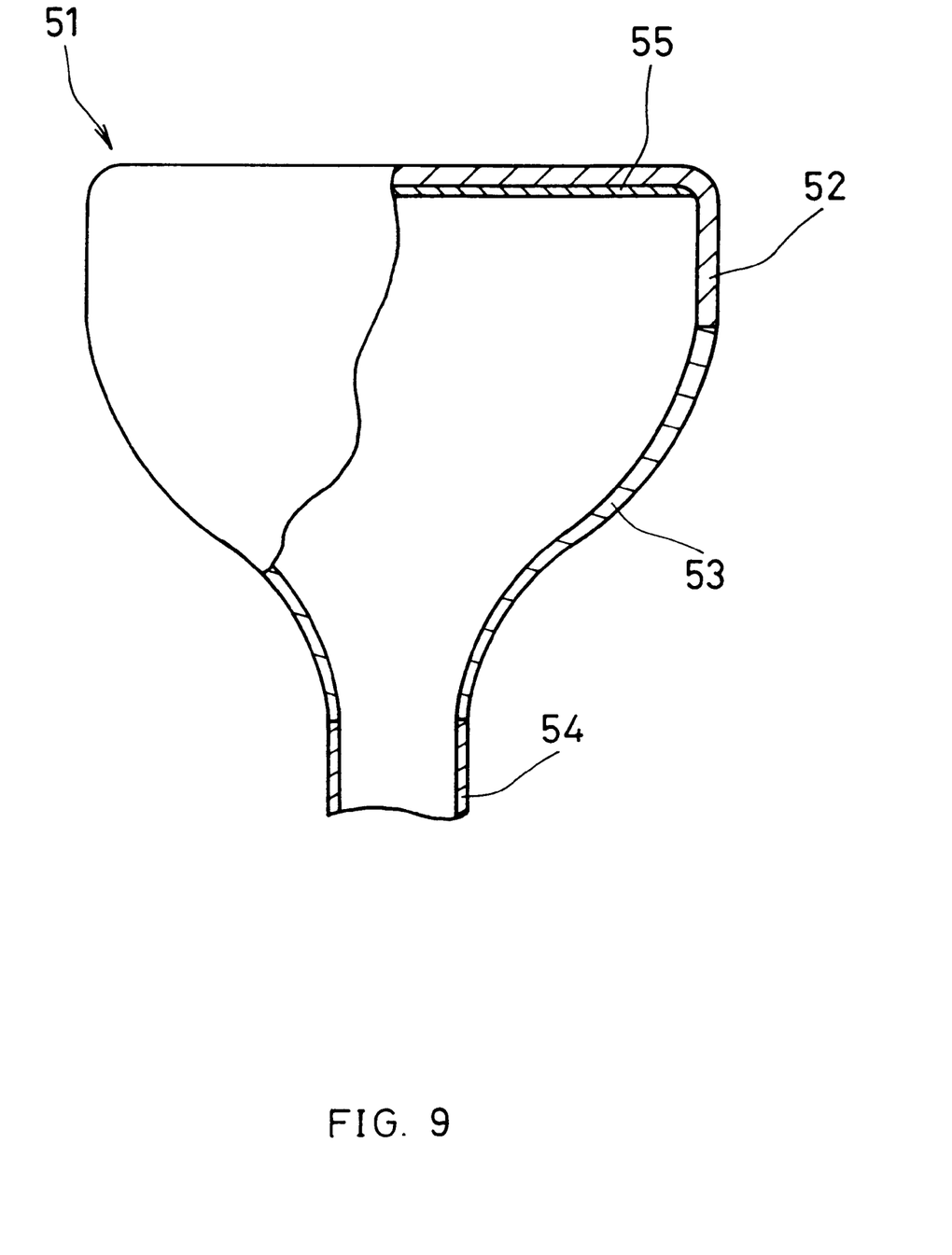
FIG. 9 is a partial cross-sectional view of one embodiment of a CRT including a panel cleaned according to the present invention.

FIG. 9 shows one embodiment of a CRT valve using a glass panel 52 cleaned by the method and apparatus described above. The CRT valve 51 is composed of a panel 52, a funnel 53, and a neck 54. A phosphor layer 55 is formed on the inner surface of the panel 52 cleaned by the above method. The CRT of the present invention is produced by a production method well-known to those skilled in the art, except that the inner surface of the panel is cleaned by the above-mentioned method.

The present invention is not limited to the above-mentioned embodiments.

INDUSTRIAL APPLICABILITY

As described above in detail, according to the regeneration method and apparatus of the present invention, a large amount of glass cleaning solution can be regenerated efficiently. Furthermore, according to the cleaning method and apparatus of the present invention, industrial waste can be reduced by extending an exchange cycle of a glass cleaning solution containing hydrofluoric acid. Thus, the present invention enables industrial waste containing hydrofluoric acid to be reduced, which was conventionally difficult, and concurrently reduces a cleaning defect of glass. The present invention is of great value for use in the technical field of the production of glass products.

What is claimed is:

1. A method for regenerating a glass cleaning solution, comprising adding fluoride provided from at least one compound selected from the group consisting of lithium fluoride, potassium fluoride, rubidium fluoride, cesium fluoride, magnesium fluoride, strontium fluoride, barium fluoride, cobalt fluoride, manganese fluoride, copper fluoride, and ammonium fluoride to a glass cleaning solution containing hydrofluoric acid after being used for cleaning a surface of silicate glass, allowing fluorosilicic acid in the glass cleaning solution to react with the fluoride to precipitate fluorosilicate and removing the precipitated fluorosilicate from the glass cleaning solution.

2. A method for regenerating a glass cleaning solution according to claim 1, wherein hydrofluoric acid is supplied to the glass cleaning solution from which the precipitated fluorosilicate has been removed.

3. A method for regenerating a glass cleaning solution according to claim 1, wherein the fluoride is added together with hydrofluoric acid.

4. A method for regenerating a glass cleaning solution according to claim 1, wherein insoluble substances in the glass cleaning solution generated from substances adhering to the surface of the silicate glass before cleaning are removed together with the precipitated fluorosilicate.

5. A method for regenerating a glass cleaning solution according to claim 1, wherein a concentration of Si in the glass cleaning solution after being used for cleaning the surface of the silicate glass is measured, and an amount of the fluoride to be added is set at an amount or more required for all the Si to be changed to the fluorosilicate.

6. A method for regenerating a glass cleaning solution according to claim 5, wherein the fluoride is added in an amount one to two times the amount required for all the Si to be changed to fluorosilicate.

7. A method for cleaning silicate glass, comprising adding fluoride provided from at least one compound selected from the group consisting of lithium fluoride, potassium fluoride, rubidium fluoride, cesium fluoride, magnesium fluoride, strontium fluoride, barium fluoride, cobalt fluoride, manganese fluoride, copper fluoride, and ammonium fluoride to a glass cleaning solution containing hydrofluoric acid after being used for cleaning a surface of silicate glass, allowing fluorosilicic acid in the glass cleaning solution to react with the fluoride to precipitate fluorosilicate, and cleaning a surface of silicate glass with the glass cleaning solution regenerated by removing the precipitated fluorosilicate from the glass cleaning solution.

8. A method for cleaning silicate glass, wherein a regeneration step of adding fluoride provided from at least one compound selected from the group consisting of lithium fluoride, potassium fluoride, rubidium fluoride, cesium fluoride, magnesium fluoride, strontium fluoride, barium fluoride, cobalt fluoride, manganese fluoride, copper fluoride, and ammonium fluoride to a glass cleaning solution containing hydrofluoric acid after being used for cleaning a surface of silicate glass, allowing fluorosilicic acid in the glass cleaning solution to react with the fluoride to precipitate fluorosilicate, and removing the precipitated fluorosilicate from the glass cleaning solution to regenerate the glass cleaning solution is conducted concurrently with a cleaning step of cleaning a surface of silicate glass with the glass cleaning solution obtained in the regeneration step, and the glass cleaning solution used in the cleaning step is further regenerated in the regeneration step, whereby the glass cleaning solution is used while being regenerated.

9. A method for cleaning silicate glass according to claim 7, wherein the silicate glass is a panel for a cathode-ray tube.

10. A method for cleaning silicate glass according to claim 9, wherein the silicate glass, before cleaning, includes a panel on which surface at least one selected from the group consisting of a black matrix layer, a phosphor layer, and a metal back layer is present.

11. An apparatus for regenerating a glass cleaning solution, for performing the method of claim 1 comprising:

a treatment tank for adding fluoride other than sodium fluoride to a glass cleaning solution containing hydrofluoric acid after being used for cleaning a surface of silicate glass; and fluorosilicate separating means for removing fluorosilicate precipitated by reaction between fluorosilicic acid in the glass etching solution and the fluoride, from the glass cleaning solution.

12. An apparatus for regenerating a glass cleaning solution according to claim 11, further comprising a settling tank for receiving the glass cleaning solution from a bottom of the treatment tank.

13. An apparatus for regenerating a glass cleaning solution according to claim 12, wherein the fluorosilicate separating means includes a drain cock provided on the bottom of at least one selected from the treatment tank and the settling tank.

14. An apparatus for regenerating a glass cleaning solution according to claim 11, further comprising an adjustment tank for supplying hydrofluoric acid to the glass cleaning solution form which the precipitated fluorosilicate has been removed.

15. An apparatus for cleaning silicate glass, comprising:

a regeneration apparatus for regenerating a glass cleaning solution for performing the method of claim 7, including a treatment tank for adding fluoride other than sodium fluoride to a glass cleaning solution containing hydrofluoric acid after being used for cleaning a surface of silicate glass and fluorosilicate separating means for removing fluorosilicate precipitated by reaction between fluorosilicic acid in the glass cleaning solution and the fluoride, from the glass cleaning solution; and a cleaning tank for receiving the glass cleaning solution from the regeneration apparatus and cleaning a surface of silicate glass with the glass cleaning solution.

16. An apparatus for cleaning silicate glass, comprising:

a regeneration apparatus for regenerating a glass cleaning solution for performing the method of claim 7, including a treatment tank for adding fluoride other than sodium fluoride to a glass cleaning solution containing hydrofluoric acid after being used for cleaning a surface of silicate glass and fluorosilicate separating means for removing fluorosilicate precipitated by reaction between fluorosilicic acid in the glass cleaning solution and the fluoride, from the glass cleaning solution; and a cleaning tank for receiving the glass cleaning solution from the regeneration apparatus and cleaning a surface of silicate glass with the glass cleaning solution, wherein the glass cleaning solution used in the cleaning tank is further regenerated in the regeneration apparatus, whereby the glass cleaning solution is used while being regenerated.

17. A cathode ray tube comprising a panel for cathode-ray tube made of silicate glass having a surface cleaned with a glass cleaning solution regenerated by the method of claim 1.

* * * * *